(12) United States Patent
Saito et al.

(10) Patent No.: US 7,322,345 B2
(45) Date of Patent: Jan. 29, 2008

(54) STUCK-OPEN FAILURE DETECTION SYSTEM FOR GAS-FUEL INJECTION VALVE

(75) Inventors: Tomoaki Saito, Hiroshima (JP); Hiroyasu Uchida, Hiroshima (JP); Yasushi Fujikawa, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/338,702

(22) Filed: Jan. 25, 2006

(65) Prior Publication Data

US 2006/0180128 A1  Aug. 17, 2006

(30) Foreign Application Priority Data

Feb. 14, 2005 (JP) .............................. 2005-035843
Aug. 18, 2005 (JP) .............................. 2005-237710

(51) Int. Cl.
*F02D 19/08* (2006.01)

(52) U.S. Cl. ..................................... 123/529
(58) Field of Classification Search ............... 123/529, 123/525, 198 D, 3, 27 GE
See application file for complete search history.

(56) References Cited

U.S. PATENT DOCUMENTS

| | | | | |
|---|---|---|---|---|
| 5,611,316 A * | 3/1997 | Oshima et al. | ............. | 123/494 |
| 6,009,860 A * | 1/2000 | Brown et al. | ............. | 123/529 |
| 6,041,762 A * | 3/2000 | Sirosh et al. | ............. | 123/529 |
| 6,401,698 B1 * | 6/2002 | Yamazaki et al. | .......... | 123/529 |
| 6,467,466 B1 | 10/2002 | Maekawa et al. | | |
| 6,918,370 B2 * | 7/2005 | Yamaoka et al. | ...... | 123/198 D |
| 6,988,489 B2 * | 1/2006 | Tanaka et al. | ............. | 123/479 |
| 7,059,276 B2 * | 6/2006 | Yamaoka et al. | ........... | 123/1 A |
| 7,100,582 B1 * | 9/2006 | Bach | .......................... | 123/529 |
| 2003/0230289 A1 * | 12/2003 | Yamaoka et al. | .......... | 123/529 |
| 2004/0045539 A1 * | 3/2004 | Furuta et al. | .............. | 123/529 |
| 2004/0244778 A1 * | 12/2004 | Tanaka et al. | ............. | 123/479 |

FOREIGN PATENT DOCUMENTS

| | | |
|---|---|---|
| JP | 5-214937 | 8/1993 |
| JP | 2001-41106 | 2/2001 |

* cited by examiner

*Primary Examiner*—Stephen K. Cronin
*Assistant Examiner*—Jason Benton
(74) *Attorney, Agent, or Firm*—Nixon Peabody LLP; Donald R. Studebaker (57) ABSTRACT

Disclosed is a stuck-open failure detection system for a gas-fuel injection valve adapted to inject or supply gas fuel into/to a combustion chamber of an engine, which comprises: a shutoff value interposed in a fuel supply passage fluidically connected to the gas-fuel injection valve, at a position upstream of the gas-fuel injection valve, and adapted to supply gas fuel to the gas-fuel injection valve in its open state; an open/close controller for controllably opening and closing the shutoff value; a pressure detector for detecting a pressure in a region of the fuel supply passage between the gas-fuel injection valve and the shutoff value; and a stuck-open failure detector for detecting a stuck-open failure that the gas-fuel injection valve is stuck in the open state, based on a pressure change detected by the pressure detector. In this stuck-open failure detection system, the open/close controller is operable, in response to an operation for starting the engine, to open the shutoff valve and then close the shutoff valve after a lapse of a given time, and the stuck-open failure detector is operable to detect the stuck-open failure, based on a pressure change detected after the open/close controller closes the shutoff valve.

5 Claims, 9 Drawing Sheets

STUCK-OPEN FAILURE DETECTION SYSTEM FOR GAS-FUEL INJECTION VALVE

BACKGROUND OF THE INVENTION

1. Field of the Invention

The present invention relates to an engine having a gas-fuel injection valve for injecting or supplying gas fuel, and more particularly to a stuck-open failure detection system for detecting a stuck-open failure of the gas-fuel injection valve (failure that the valve is struck in an open state and cannot be returned to a closed state).

2. Description of the Related Art

In recent years, for the purpose of achieving lower emission, developments of a vehicle equipped with an engine using gas fuel, such as compressed natural gas, compressed propane gas or compressed hydrogen gas, have been accelerated. In the engine using gas fuel, due to properties of gas fuel, such as significantly larger bulk ratio and higher combustion speed as compared with those of gasoline, it is more difficult to ensure an air intake quantity and control a gas-fuel supply quantity. Moreover, if new gaseous hydrogen is added to an intake system having residual gaseous hydrogen during engine start, a resulting air-fuel mixture having an excessively increased hydrogen concentration is likely to cause the phenomenon that the air-fuel mixture is burnt in the intake system or the phenomenon (so-called "afterburn") that exhaust gas containing unburnt gaseous hydrogen is burnt in an exhaust system. As one of measures against these problems, it has been proposed to interpose a shutoff valve in a hydrogen supply passage on an upstream side of a gas-fuel injection valve and close the shutoff valve at engine stall so as to avoid occurrence of backfire and afterburn, as disclosed, for example, in Japanese Patent Laid-Open Publication No. 05-214937.

Further, in the engine using gas fuel, a gas-fuel injection valve for injecting and supplying gas fuel into a combustion chamber is likely to have a failure that the gas-fuel injection valve is stuck in an open state and cannot be returned to a closed state (hereinafter referred to as "stuck-open failure"). This stuck-open failure causes gas fuel leakage to the combustion chamber, and the gas fuel leaked to the combustion chamber could be factors causing backfire or afterburn if it flows into an intake system or an exhaust system. Thus, such gas fuel leakage must be prevented by adequately monitoring a state of the gas-fuel injection valve to detect a stuck-open failure thereof. As one conventional example of a method for detecting a stuck-open failure of a gas-fuel injection valve, Japanese Patent Laid-Open Publication No. 2001-41106 proposes a method which comprises closing a shutoff valve interposed in a gas-fuel supply passage immediately after engine stop, detecting in the gas-fuel supply passage a pressure P1 just after shutoff of the shutoff valve and a pressure P2 at a time when a given time has elapsed after shutoff of the shutoff valve, and if a pressure difference (P1-P2) is equal to or greater than a predetermined value, determining that a stuck-open failure occurs in the gas-fuel injection valve.

In the above type of engine, a pressure in a gas-fuel supply passage is apt to fluctuate along with consumption of gas fuel. Thus, when a pressure P1 in the gas-fuel supply passage is detected just after a shutoff valve interposed in the gas-fuel supply passage is closed in response to engine stop, the pressure P1 is likely to have a small value depending on timing of the detection. In this case, a pressure difference (P1-P2) between the pressure P1 and a pressure P2 detected after a lapse of a given time becomes smaller, and therefore a stuck-open failure of a gas-fuel injection valve cannot be adequately detected if any. Moreover, the detection of a stuck-open failure is performed at the timing of engine stop, and this is likely to cause delay in detection of the failure.

In view of the above conventional technical problems, it is an object of the present invention to provide a stuck-open failure detection system for a gas-fuel injection valve, capable of adequately detecting a stuck-open failure of the gas-fuel injection valve to prevent gas fuel from leaking into a combustion chamber while avoiding occurrence of abnormal combustion, such as backfire and afterburn.

SUMMARY OF THE INVENTION

In order to achieve the above object, in an aspect of the present invention, there is a provided a stuck-open failure detection system for a gas-fuel injection valve adapted to inject or supply gas fuel into/to a combustion chamber of an engine, comprising: a shutoff value interposed in a fuel supply passage fluidically connected to said gas-fuel injection valve, at a position upstream of said gas-fuel injection valve, and adapted to supply gas fuel to said gas-fuel injection valve in its open state; a open/close controller for controllably opening and closing said shutoff value; a pressure detector for detecting a pressure in a region of said fuel supply passage between said gas-fuel injection valve and said shutoff value; and a stuck-open failure detector for detecting a stuck-open failure that said gas-fuel injection valve is stuck in the open state, based on a pressure change detected by said pressure detector, wherein: said stuck-open failure detector is operable to detect said stuck-open failure, based on a pressure change detected after a lapse of a given time from a moment of an operation for starting or stopping the engine.

According to the stuck-open failure detection system set forth in the aspect of the present invention, since the stuck-open failure of the gas-fuel injection valve is detected based on a pressure change detected after a lapse of a given time from a moment of an operation for starting or stopping the engine, it is possible to adequately detect the stuck-open failure of the gas-fuel injection valve, or gas fuel leakage from the gas-fuel injection valve to the combustion chamber can be detected in an early stage.

In the stuck-open failure detection system set forth in the aspect of the present invention, said open/close controller may be operable, in response to an operation for starting the engine, to open said shutoff valve and then close said shutoff valve after a lapse of a given time, and said stuck-open failure detector may be operable to detect said stuck-open failure, based on a pressure change detected after said open/close controller closes said shutoff valve.

In this case, the stuck-open failure of the gas-fuel injection valve can be adequately detected during the engine start operation, or gas fuel leakage from the gas-fuel injection valve to the combustion chamber can be detected in an early stage.

Also, in the stuck-open failure detection system set forth in the aspect of the present invention, the engine may be adapted to use both gas fuel and gasoline, and may be provided with a fuel-supply-mode switch for switching between a gasoline supply mode and a gas-fuel supply mode, and an ignition controller for controlling an operation of a spark plug for igniting fuel in the combustion chamber, the ignition controller may be operable, when the stuck-open failure is detected by the stuck-open failure detector, to stop the ignition operation of the spark plug for a given time-period after the detection so as to facilitate scavenging, and the fuel-supply-mode switch may be operable, after the scavenging under the stop of the ignition operation, to switch from the gas-fuel supply mode to the gasoline supply mode.

In this case, when the stuck-open failure of the gas-fuel injection valve is detected, the gas-fuel supply mode is switched to the gasoline supply mode after scavenging of gas fuel in the combustion chamber. This makes it possible to start the engine using gasoline so as to ensure an adequate engine start performance while avoiding occurrence of abnormal combustion, such as afterburn.

Furthermore, in the stuck-open failure detection system set forth in the aspect of the present invention, said open/close controller may be operable, in response to an operation for stopping the engine from the running state thereof, to close said shutoff valve after holding said shutoff valve in the open state for a given time-period, and said stuck-open failure detector may be operable to detect said stuck-open failure, based on a pressure change detected after said open/close controller closes said shutoff valve.

In this case, it is possible to suppress adverse affects of a pressure fluctuation in the open state of the gas-fuel injection valve so as to prevent a false detection of the stuck-open failure. In addition, the process of detecting the stuck-open failure of the gas-fuel injection valve can be performed while avoiding a situation where a driver feels strange or odd.

Moreover, in the stuck-open failure detection system set forth in the aspect of the present invention, the stuck-open failure detection system may include an alarm unit for generating an alarm when the stuck-open failure is detected by the stuck-open failure detector.

In this case, information about occurrence of the stuck-open failure of the gas-fuel injection valve can be given to a driver.

DESCRIPTION OF THE PREFERRED EMBODIMENTS

Figure 1:
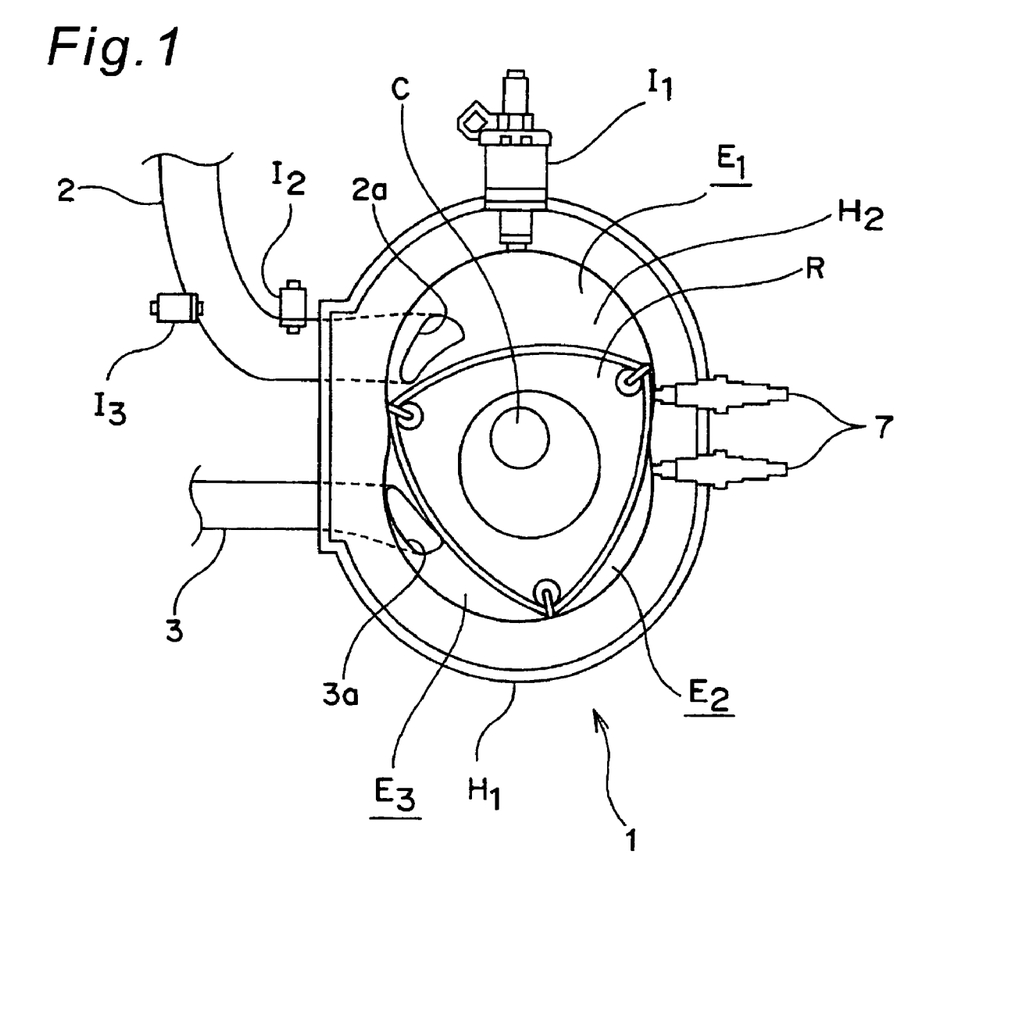
FIG. 1 is a schematic diagram showing a hydrogen-fueled engine having a stuck-open failure detection system according to one embodiment of the present invention.

With reference to the accompanying drawings, an embodiment of the present invention will now be described. FIG. 1 is a schematic diagram showing a rotary-type hydrogen-fueled engine having a stuck-open failure detection system according to one embodiment of the present invention. This hydrogen-fueled engine 1 comprises, as a component forming an outer shape thereof, a rotor housing $H_1$ having a trochoid-shaped inner surface, and a pair of flat plate-shaped side housings $H_2$ disposed opposed, respectively, to opposite sides of the rotor housing $H_2$ to extend along corresponding flat surfaces of a rotor R housed in an inner space defined by the rotor housing $H_1$ and the side housings $H_2$. The rotor R has an outer peripheral surface formed to define three combustion chambers (hereinafter referred to as "working chambers") $E_1$, $E_2$, $E_3$ in cooperation with respective inner surfaces of the rotor housing $H_1$ and the side housings $H_2$. In conjunction with rotation of the rotor R about an eccentric shaft C, each of the working chambers $E_1$, $E_2$, $E_3$ is sequentially expanded and compressed to produce one power cycle consisting of intake, compression, expansion and exhaust strokes per 360-degree rotation of the rotor R.

The rotor housing $H_1$ is provided with a gaseous hydrogen injection valve $I_1$ for injecting gaseous hydrogen directly into each of the working chambers $E_1$, $E_2$, $E_3$ (hereinafter referred to as "direct-injection hydrogen injector $I_1$") and a pair of spark plugs 7 for igniting an air-fuel mixture consisting of fuel and air supplied into each of the working chambers $E_1$, $E_2$, $E_3$. At least one of the side housings $H_2$ is formed with an inlet port 2a fluidically connected to an intake passage 2, and an exhaust port 3a fluidically connected to an exhaust passage 3.

In this embodiment, in addition to the direct-injection hydrogen injector $I_1$ attached to the rotor housing $H_1$, a gasoline injection valve $I_2$ for injecting gasoline into the intake passage 2 (hereinafter referred to as "port-injection gasoline injector $I_2$") and a hydrogen injection valve $I_3$ for injecting gaseous hydrogen into the intake passage 2 (hereinafter referred to as "port-injection hydrogen injector $I_3$") are attached to the intake passage 2. When it is necessary to supply fuel to the working chambers of the hydrogen-fueled engine 1, an appropriate one of the direct-injection hydrogen injector $I_1$, the port-injection gasoline injector $I_2$ and the port-injection hydrogen injector $I_3$ is selected depending on various states, such as an engine speed and a quantity of remaining hydrogen or gasoline, or according to driver's need.

Figure 2:
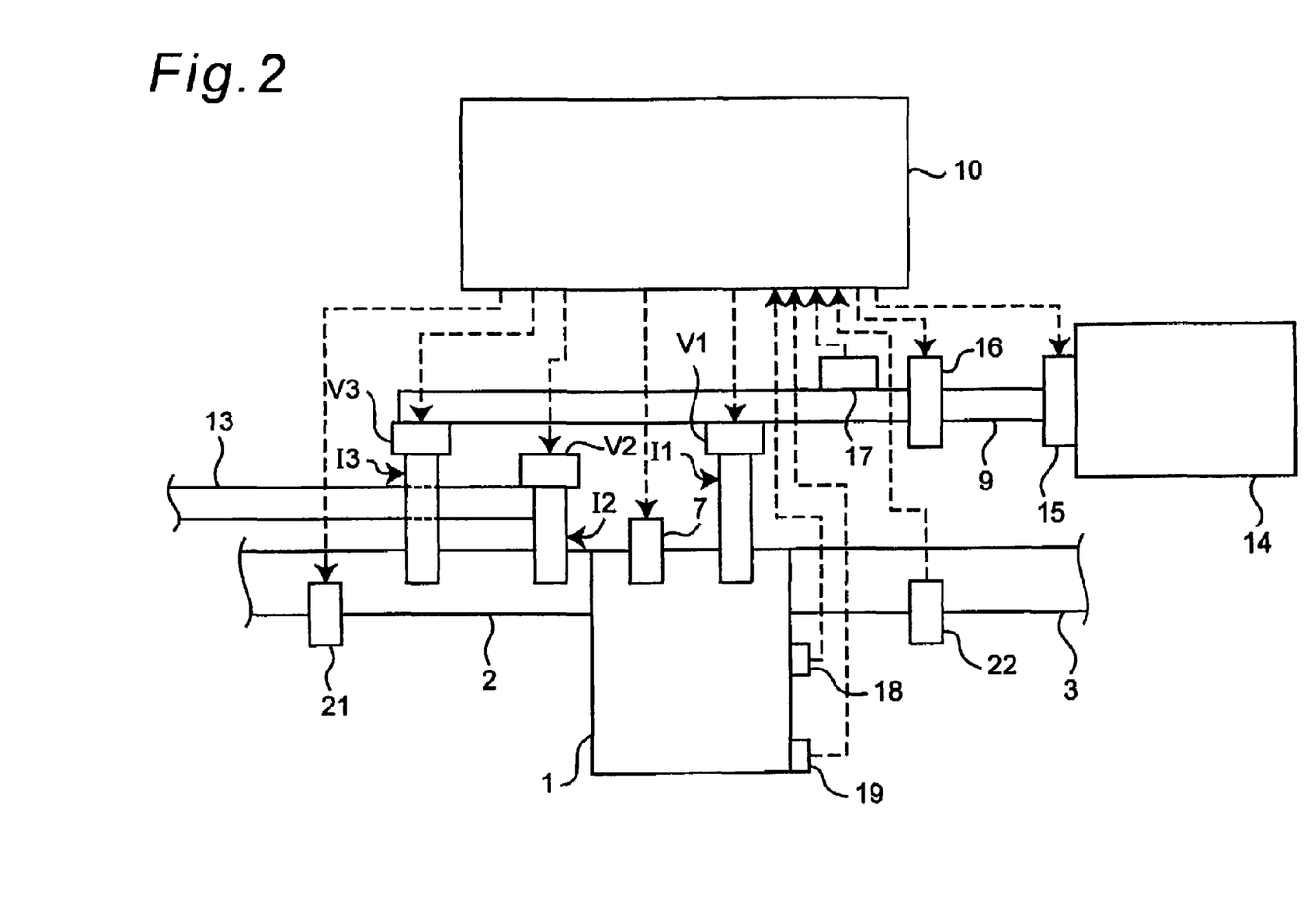
FIG. 2 is a conceptual diagram showing the hydrogen-fueled engine and associated components.

FIG. 2 is a conceptual drawing showing the hydrogen-fueled engine 1 and associated components. As seen in FIG. 2, three solenoid valves $V_1$, $V_2$, $V_3$ are associated, respectively, with the direct-injection hydrogen injector $I_1$, the port-injection gasoline injector $I_2$ and the port-injection hydrogen injector $I_3$, and a fuel injection operation in each of the injectors is controlled based on an opening/closing action of a corresponding one of the solenoid valves $V_1$, $V_2$, $V_3$. While the solenoid valves $V_1$, $V_2$, $V_3$ and the corresponding injectors $I_1$, $I_2$, $I_3$ are illustrated in FIG. 2 as if they are discrete components, each of the solenoid valves $V_1$, $V_2$, $V_3$ is actually incorporated and built in a corresponding one of the injectors $I_1$, $I_2$, $I_3$.

A body of the hydrogen-fueled engine 1 is provided with a coolant temperature sensor 18 for detecting a temperature of coolant for the engine 1, and an engine speed sensor 19 for detecting an engine speed. Further, an intake-air temperature sensor 21 is attached to the intake passage 2 to detect a temperature of air which is flowing through the intake passage 2, and an oxygen concentration sensor (so-called "linear $O_2$ sensor") 22 is attached to the exhaust passage 3 to detect an oxygen concentration in exhaust gas so as to estimate an air-fuel ratio in the working chambers.

Further, as shown in FIG. 2, each of the direct-injection hydrogen injector $I_1$ attached to the rotor housing $H_1$ constituting the engine body and the port-injection hydrogen injector $I_3$ attached to the intake passage 2 is fluidically connected to a hydrogen storage tank 14 for storing gaseous hydrogen, through a hydrogen supply pipe 9. The port-injection gasoline injector $I_2$ attached to the intake passage 2 is fluidically connected to a gasoline storage tank (not shown) through a gasoline supply pipe 13. The hydrogen storage tank 14 has an outlet port provided with a stop valve 15 adapted to be controllably opened and closed so as to regulate the discharge of hydrogen from the hydrogen storage tank 14 to the hydrogen supply pipe 9. Further, a shutoff valve 16 is interposed in the hydrogen supply pipe 9 at a position upstream of the direct-injection hydrogen injector $I_1$ and the port-injection hydrogen injector $I_3$. The shutoff valve 16 is designed to be opened and closed to control the supply of hydrogen to the hydrogen injectors $I_1$, $I_3$. Specifically, the shutoff valve 16 is designed to supply gaseous hydrogen to the hydrogen injectors $I_1$, $I_3$ in its open state, and fundamentally controlled in such a manner as to be opened in a running state of the engine and closed in a stopped state of the engine. Further, a pressure sensor 17 is attached to the hydrogen supply pipe 9 at a position between the shutoff valve 16 and the hydrogen injectors $I_1$, $I_3$, to detect a residual pressure in the hydrogen supply pipe 9 so as to calculate a quantity of hydrogen remaining in the hydrogen storage tank 14.

Although not particularly illustrated, as other components associated with the hydrogen-fueled engine 1, the intake passage 2 is provided with an air cleaner, an airflow sensor for detecting an intake-air flow rate, a throttle valve adapted to be opened and closed in proportion to a displacement of an accelerator pedal (not shown) so as to control an intake-air flow rate, a throttle opening sensor for detecting an opening of the throttle valve, and a surge tank for stabilizing a flow of intake air. The exhaust passage 3 is provided with an exhaust-gas purifying device, and an exhaust-gas temperature sensor. Further, each of the hydrogen supply passage 9 and the gasoline supply passage 13 is provided with a fuel flow meter for detecting a flow rate of fuel to be supplied to each of the injectors.

Furthermore, as shown in FIG. 2, a control unit 10 is provided as a means to control the hydrogen-fueled engine 1 and associated components. Specifically, the control unit 10 is a general control device of the hydrogen-fueled engine 1 composed of a computer. Based on various control data, such as an intake-air flow rate detected by the airflow sensor, an engine coolant temperature detected by the coolant sensor 18, a throttle opening detected by the throttle opening sensor and an idle switch (adapted to be turned on when the throttle valve is in its fully closed state: not shown), an engine speed detected by the engine speed sensor 19, an exhaust-gas temperature detected by the exhaust-gas temperature sensor and respective fuel flow rates for the injectors, which are detected by the fuel flow meters, the control unit 10 is operable to perform various controls, such as a fuel injection control and ignition timing control of the engine, and perform a process of detecting a stuck-open failure in the hydrogen injectors (the direct-injection hydrogen injector $I_1$ and the port-injection hydrogen injector $I_3$) and a process of controlling fuel supply, as described later. The control unit 10 has a built-in microcomputer (not shown), and operations, such as correction, calculation and determination, necessary for various controls including a drive control for the injectors $I_1$, $I_2$, $I_3$, are performed by this microcomputer.

A control of selecting one of the direct-injection hydrogen injector $I_1$ and the port-injection hydrogen injector $I_3$ depending on an engine speed detected by the engine speed sensor 19, and changing a fuel injection timing of each of the selected injectors, as one of the controls to be performed by the control the control unit 10, will be described below.

Figure 3:
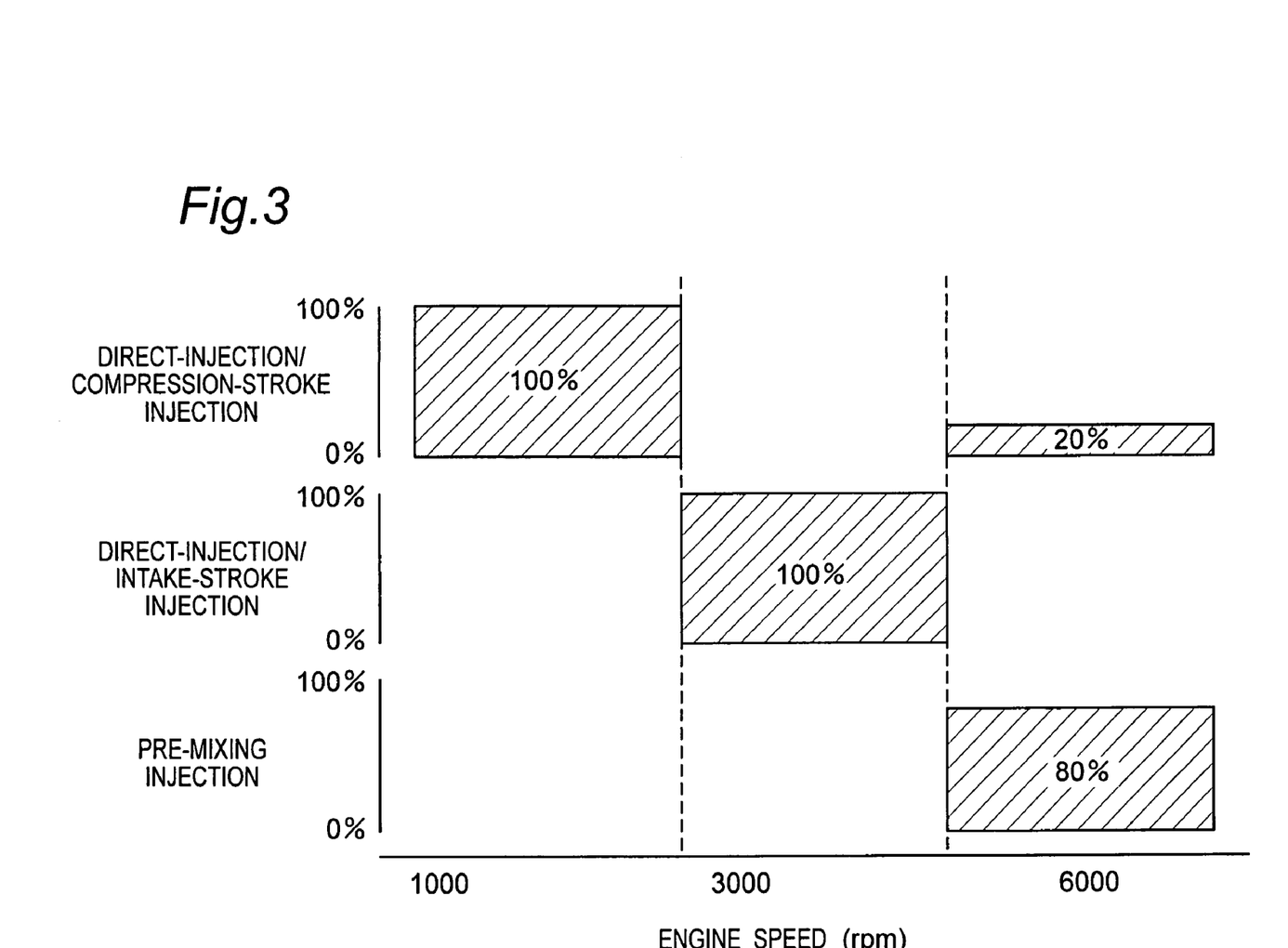
FIG. 3 is an explanatory diagram showing each hydrogen injector to be selectively used depending on engine speeds, and a fuel injection timing thereof.

FIG. 3 is an explanatory diagram showing each of the hydrogen injectors to be selectively used depending on engine speeds, and a fuel injection timing thereof. In a low speed range (about 800 to 2500 rpm), the direct-injection hydrogen injector $I_1$ is selected, and controlled to inject gaseous hydrogen during a compression stroke. Then, in order to cope with a problem that, if gaseous hydrogen having a large bulk ratio is injected during an intake stroke, a sufficient volume of air cannot be charged into the working chamber through the intake port 2a, gaseous hydrogen is injected during the compression stroke after completion of the intake stroke to suppress deterioration in charging efficiency.

In an intermediate speed range (about 2500 to 5000 rpm), the direct-injection hydrogen injector $I_1$ is selected, and controlled to inject gaseous hydrogen during an intake stroke. Then, in order to cope with a problem that, if an air-fuel mixture is ignited in a state when gaseous hydrogen and air are separated from one another, abnormal combustion will occur, the direct-injection hydrogen injector $I_1$ is controlled to inject gaseous hydrogen at an early stage of the intake stroke to ensure a sufficient mixing time so as to provide enhanced mixing between gaseous hydrogen and air.

In a high speed range (about 5000 to 7000 rpm), the direct-injection hydrogen injector $I_1$ and the port-injection hydrogen injector $I_3$ are selected. Then, in order to provide enhanced mixing between gaseous hydrogen and air, the port-injection hydrogen injector $I_3$ is controlled to inject gaseous hydrogen into the intake passage so as to form a pre-mixed mixture (pre-mixing injection). Further, in order to prevent deterioration in torque, the direct-injection hydrogen injector $I_1$ is controlled to additionally inject gaseous hydrogen in a compression stroke. As to a hydrogen supply ratio, for example, 80% of the total hydrogen is supplied from the port-injection hydrogen injector $I_3$, and 20% of the total hydrogen is supplied from the direct-injection hydrogen injector $I_1$.

As mentioned above, if the direct-injection hydrogen injector $I_1$ or the port-injection hydrogen injector $I_3$ has a stuck-open failure that the injector cannot be returned to the closed state, resulting hydrogen leakage to the combustion chamber is likely to cause backfire and afterburn. In this embodiment, in order to minimize adverse affects of hydrogen leakage due to the stuck-open failure, and ensure an adequate engine start performance even if the stuck-open failure occurs, a process of detecting a stuck-open failure in the hydrogen injectors $I_1$ and $I_3$ (hydrogen-injector stuck-open failure detection process) and a process of controlling fuel supply (fuel-supply control process) are performed as follows.

The hydrogen-injector stuck-open failure detection process comprises the steps of closing the shutoff valve 16 after temporarily opening it in response to an engine start operation, then monitoring a pressure change between the shutoff valve 16 and the hydrogen injectors $I_1$ and $I_3$, and, if a predetermined condition is satisfied, determining that the stuck-open failure occurs in the hydrogen injector $I_1$ or $I_3$.

In order to ensure an adequate engine start performance, the fuel-supply control process comprises the steps of closing the shutoff valve 16, when the stuck-open failure of the hydrogen injector $I_1$ or $I_3$ is detected, simultaneously stopping the ignition operation of the spark plugs 7 for a given time-period to facilitate scavenging, and, after the scavenging, switching the fuel supply source from the hydrogen injector $I_1$ or $I_3$ to the gasoline injector $I_2$. Further, in order to reliably start the engine without abnormal combustion, the fuel-supply control process includes the step of, when the presence of hydrogen becomes undetectable by the linear $O_2$ sensor 22, switching the fuel supply source from the hydrogen injector $I_1$ or $I_3$ to the gasoline injector $I_2$.

First Embodiment

Figure 4:
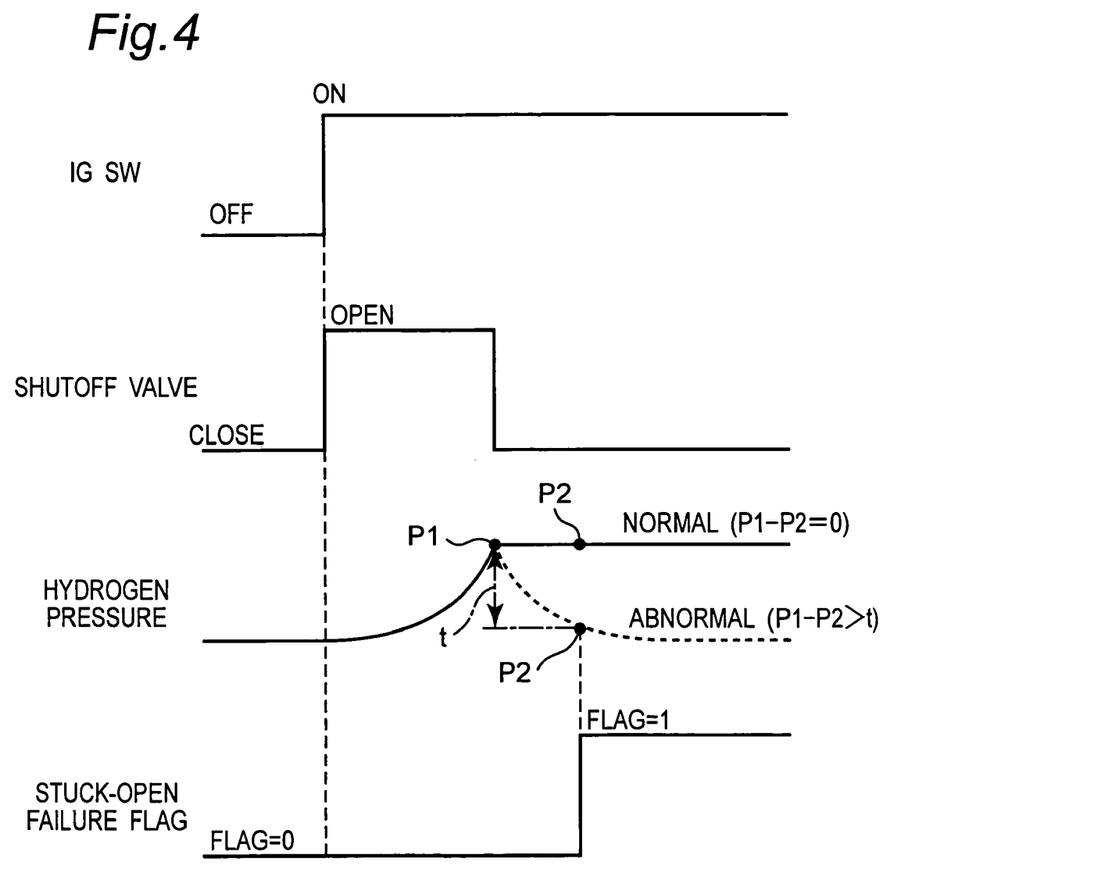
FIG. 4 is a time chart showing changes in parameter values during a hydrogen-injector stuck-open failure detection process to be performed in response to an engine start operation.

FIG. 4 is a time chart showing changes in parameter values during the above hydrogen-injector stuck-open failure detection process. In FIG. 4, ON/OFF states of an ignition switch (not shown), the open/closed states of the shutoff valve 16, a hydrogen pressure detected by the pressure sensor 17, and changes in a stuck-open failure flag (FLAG) indicative of the presence or absence of the stuck-open failure, are shown as parameter values.

In response to an engine start operation triggered by turning on the ignition switch, the shutoff valve 16 in the closed state is temporarily opened. In response to opening the shutoff valve 16, a hydrogen pressure detected by the pressure sensor 16 in a region of the hydrogen supply pipe between the shutoff valve 16 and the hydrogen injectors $I_1$ and $I_3$ is gradually increased. Then, the shutoff valve 16 is closed, and a hydrogen pressure P1 at this moment is detected. Subsequently, a hydrogen pressure change will be monitored.

Specifically, a difference (P1-P2) between the hydrogen pressure P1 and a hydrogen pressure P2 after the shutoff valve 16 is closed is calculated, and a change of this difference is monitored. If P2 is maintained approximately at P1, as indicated by the solid line, or (P1-P2) is approximately zero, it is determined that the hydrogen injectors $I_1$ and $I_3$ normally operate without hydrogen leakage. In contrast, if the hydrogen pressure P2 becomes lower, and the difference (P1-P2) becomes greater than a predetermined value "t", it is immediately determined that hydrogen leakage occurs in the hydrogen injector $I_1$ or $I_3$, and the hydrogen injector $I_1$ or $I_3$ does not normally operate. According to this determination, the stuck-open failure flag (FLAG) is set from "0" to "1".

Figure 5A:
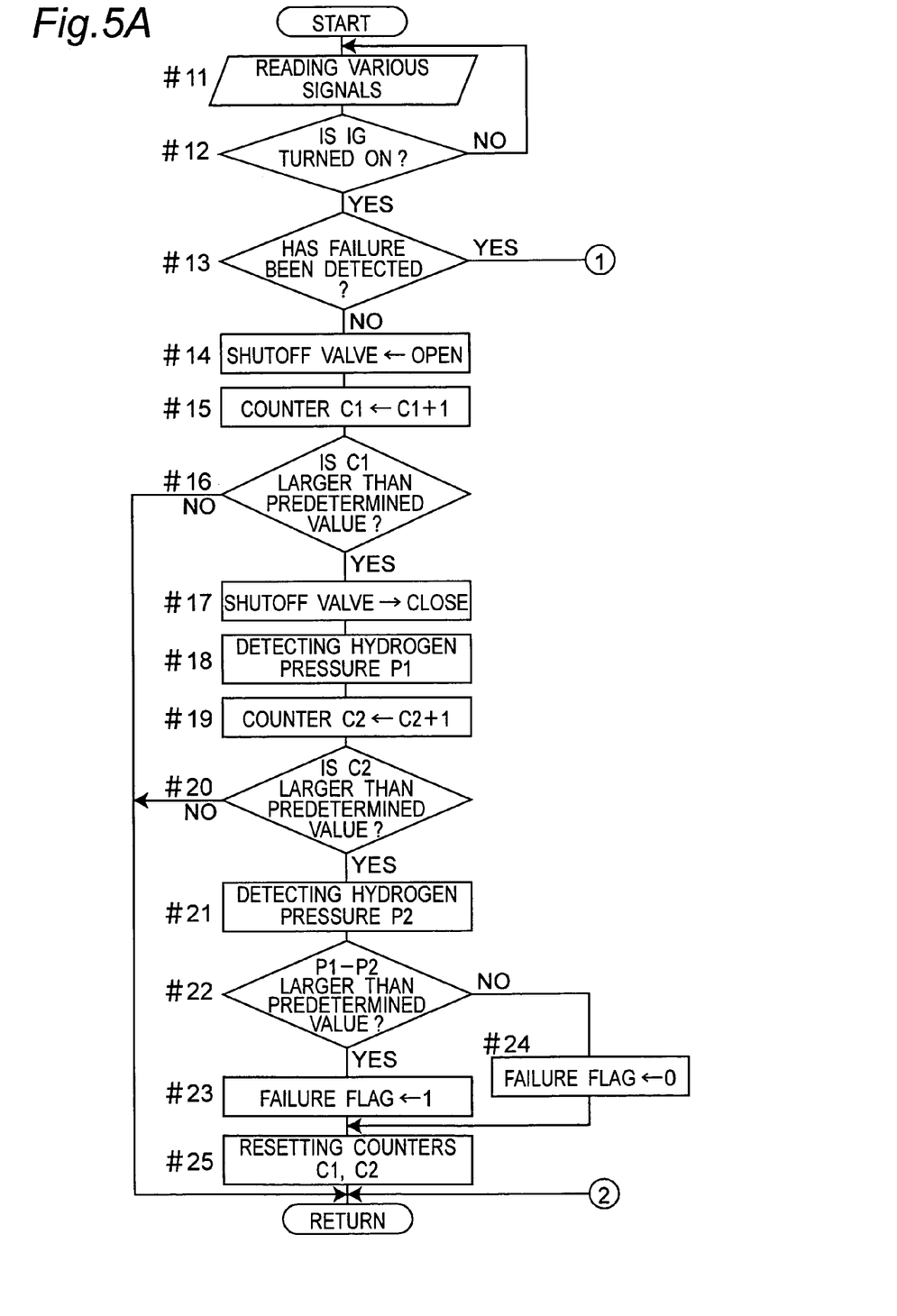
FIG. 5A is a first flowchart showing the hydrogen-injector stuck-open failure detection process and a fuel-supply control process to be performed in response to the engine start operation according to a control unit.
Figure 5B:
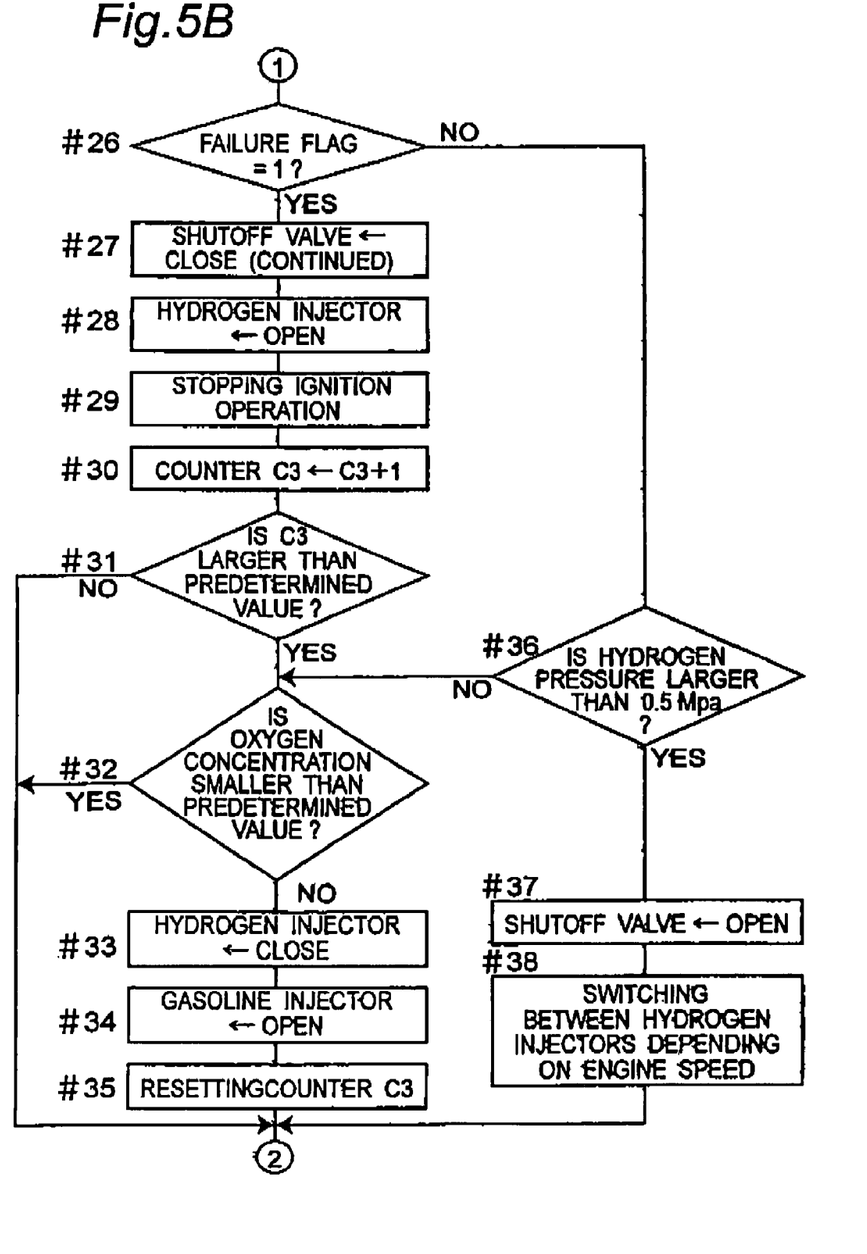
FIG. 5B is a second flowchart showing the hydrogen-injector stuck-open failure detection process and the fuel-supply control process to be performed in response to the engine start operation according to the control unit.

FIGS. 5A and 5B are flowcharts showing the hydrogen-injector stuck-open failure detection process and the fuel-supply control process to be performed in response to the engine start operation according to the control unit 10. In this process, various signals detected by a plurality of components associated with the hydrogen-fueled engine 1, as shown, for example, in FIG. 2, are read (#11), and it is determined whether the hydrogen-fueled engine 1 is started or whether the ignition switch is switched from the OFF state to the ON state (#12). If the determination in Step #12 is NO, or it is determined that the hydrogen-fueled engine 1 is not started, the process returns to Step #11, and the subsequent steps will be repeated. If it is determined that the hydrogen-fueled engine 1 is started, the process advances to Step #13.

In Step #13, it is determined whether a stuck-open failure of the hydrogen injectors $I_1$ and $I_3$ has already been detected. If the determination in Step #13 is YES, or it is determined that the stuck-open failure has already been detected, the process advances to Step #26 in FIG. 5B through the circled number 1. Operations in Step #26 and subsequent steps will be described later. If it is determined that the stuck-open failure has not been detected, the shutoff valve 16 is opened (#14), and a first counter is incremented by one (C1→C1+1) (#15).

After Step #15, it is determined whether the first counter has a value greater than a predetermined value (#16). If the determination in Step #16 is NO, or it is determined that the first counter has a value equal to or less than the predetermined value, the process is immediately returned. If it is determined that the first counter has a value greater than the predetermined value, the shutoff valve 16 is closed (#17), and, at this moment, a hydrogen pressure P1 (see FIG. 4) in a region of the hydrogen supply pipe between the shutoff valve 16 and the hydrogen injectors $I_1$ and $I_3$ is detected by the pressure sensor 17 (#18). Then, a second counter is incremented by one (C2→C2+1) (#19).

After Step #19, it is determined whether the second counter has a value greater than a predetermined value (#20). If the determination in Step #20 is NO, or it is determined that the second counter has a value equal to or less than the predetermined value, the process is immediately returned. If it is determined that the second counter has a value greater than the predetermined value, a hydrogen pressure P2 (see FIG. 4) in the region of the hydrogen supply pipe between the shutoff valve 16 and the hydrogen injectors $I_1$ and $I_3$ is detected at this moment by the pressure sensor 17 (#21).

After Step #21, it is determined whether a difference (P1-P2) between the hydrogen pressures P1 and P2 is greater than a predetermined value (#22). If the determination in Step #22 is YES, or it is determined whether (P1-P2) is greater than the predetermined value, it is regarded that a stuck-open failure occurs in the hydrogen injector $I_1$ or $I_3$, and the stuck-open failure flag (FLAG) is set to "1" (#23). If it is determined whether (P1-P2) is equal to or less than the predetermined value, it is regarded that the hydrogen injectors $I_1$ and $I_3$ are normal, and the stuck-open failure flag is set to "0" (#24). After each of Steps #23 and #24, the first and second counters are reset (#25). Then, the process is returned.

Referring to FIG. 5B, in Step #26, it is determined whether the stuck-open failure flag is "1". If the determination in Step #26 is NO, or it is determined whether the stuck-open failure flag is "0", the process advances to Step #36. If it is determined whether the stuck-open failure flag is "1", the shutoff valve 16 is maintained in the closed state (#27). Further, the hydrogen injector $I_1$ or $I_3$ is opened (#28), and simultaneously the ignition operation is stopped (#29). Then, a third counter is incremented by one (C3→C3+1) (#30).

After Step #30, it is determined whether the third counter has a value greater than a predetermined value (#31). If the determination in Step #31 is NO, or it is determined that the third counter has a value equal to or less than the predetermined value, the process is immediately returned. If it is determined that the third counter has a value greater than the predetermined value, it is determined whether an oxygen concentration detected by the linear $O_2$ sensor 22 is less than a predetermined value (#32). If the determination in Step #32 is YES, or it is determined that the oxygen concentration is less than the predetermined value, the process is immediately returned. If it is determined that the oxygen concentration is equal to or greater than the predetermined value, the hydrogen injector $I_1$ or $I_3$ is closed (#33), and then the gasoline injector $I_2$ is opened (#34). Then, the third counter is reset (#35).

After Step #36, it is determined whether the hydrogen pressure detected by the pressure sensor 17 (see FIG. 2) is greater than 0.5 MPa (#36). If the determination in Step #36 is NO, or it is determined that the hydrogen residual pressure is equal to less than 0.5 MPa, it is regarded that a quantity of remaining hydrogen in the hydrogen storage tank 14 is not sufficient, and process advances to Step #32 so as to perform the aforementioned steps. If it is determined that the hydrogen residual pressure is greater than 0.5 MPa, it is regarded that a quantity of remaining hydrogen in the hydrogen storage tank 14 is sufficient, and the shutoff valve 16 is opened (#37). Then, the direct-injection hydrogen injector $I_1$ and the port-injection hydrogen injector $I_3$ are switched depending on an engine speed (#38), as described above with reference to FIG. 3. Then, the process is returned.

As above, the shutoff valve 16 is closed after being maintained in the open state for a given time-period in response to the engine start operation, and then a stuck-open failure of the hydrogen injector $I_1$ or $I_3$ is detected based on a pressure difference in a region of the hydrogen supply pipe between the shutoff valve 16 and the hydrogen injectors $I_1$ and $I_3$. This makes it possible to prevent hydrogen leakage from the hydrogen injector $I_1$ or $I_3$ to the combustion chamber. Further, when the stuck-open failure of the hydrogen injector $I_1$ or $I_3$ is detected, the hydrogen supply mode is switched to the gasoline supply mode after scavenging of hydrogen in the combustion chamber. Thus, the engine can be started using gasoline to ensure an adequate engine start performance while avoiding occurrence of abnormal combustion, such as afterburn. In addition, the switching to the gasoline supply mode is performed after confirming that hydrogen in the combustion chamber is fully scavenged, by use of the linear $O_2$ sensor 22. This makes it possible to more reliably ensure the adequate engine start performance.

Second Embodiment

Figure 6:
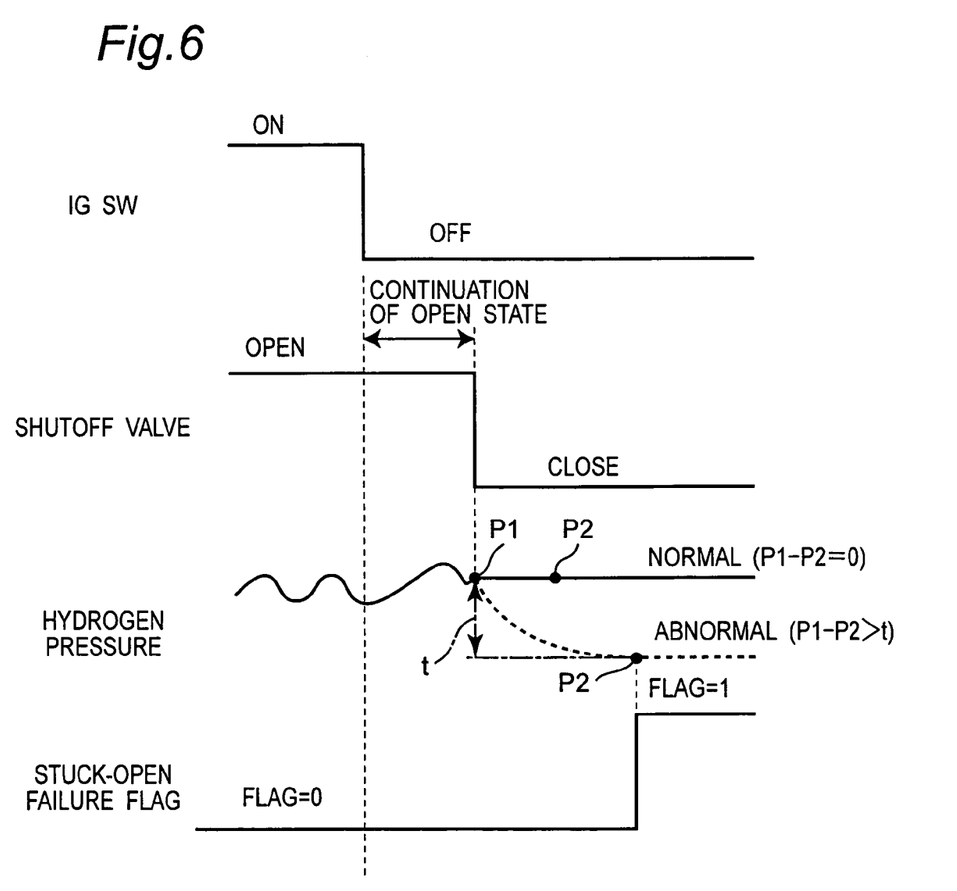
FIG. 6 is a time chart showing changes in parameter values during a hydrogen-injector stuck-open failure detection process to be performed in response to an operation for stopping the engine from a running state thereof.

A hydrogen-injector stuck-open failure detection process and a fuel-supply control process to be performed in response to an operation for stopping the engine from a running state thereof will be described below. FIG. 6 is a time chart showing changes in parameter values during the hydrogen-injector stuck-open failure detection process to be performed in response to the operation for stopping the engine from a running state thereof. In FIG. 6, the ON/OFF states of the ignition switch (not shown), the open/closed states of the shutoff valve 16, a hydrogen pressure detected by the pressure sensor 17, and changes in the stuck-open failure flag (FLAG) indicative of the presence or absence of the stuck-open failure, are shown as parameter values.

As seen in a hydrogen pressure change illustrated in FIG. 6, in an engine using gas fuel, such as gaseous hydrogen, a pressure in a gas-fuel supply passage is generally apt to fluctuate along with consumption of gas fuel in a state when a gas-fuel injection valve is opened. Specifically, based on applicant's test data, it was verified that, in the hydrogen supply pipe 9 having a pressure of 0.5 MPa when the hydrogen injector $I_1$ is closed, the pressure has a fluctuation range of about 0.3 MPa when the hydrogen injector $I_1$ is opened. That is, when a pressure P1 in the hydrogen supply pipe 9 is detected immediately after the hydrogen injector $I_1$ and the shutoff valve 16 are closed in response to an engine stop operation, the pressure P1 is likely to have a small value depending on the detection timing. In this case, a pressure difference (P1-P2) between the pressure P1 and a pressure P2 detected after a lapse of a given time becomes small, and a stuck-open failure of the hydrogen injector $I_1$ cannot be adequately detected if any.

As measures against this problem, in this embodiment, instead of closing the shutoff valve immediately after initiation of an operation for stopping the engine from a running state thereof, for example, by switching the ignition switch from the ON state to the OFF state, the shutoff valve is closed after being maintained in the open state for a given time-period after initiation of the engine stop operation. As shown in FIG. 6, in the given time-period where the hydrogen injectors $I_1$ and $I_3$ are closed and the shutoff valve is maintained in the open state after initiation of the operation for stopping the engine from a running state thereof, a hydrogen pressure detected by the pressure sensor 17 in a region of the hydrogen supply pipe between the shutoff valve 16 and the hydrogen injectors $I_1$ and $I_3$ will be gradually increased. Then, after the lapse of the given time, the shutoff valve 16 is closes, and a hydrogen pressure P1 at this moment is detected. Further, a hydrogen pressure P2 after detection of the hydrogen pressure P1 is detected in the closed state of the shutoff valve 16. Then, a hydrogen pressure difference (P1-P2) is calculated to monitor a change in hydrogen pressure. If P2 is maintained approximately at P1, as indicated by the solid line, or (P1-P2) is approximately zero, it is determined that the hydrogen injectors $I_1$ and $I_3$ normally operate without hydrogen leakage. In contrast, if the hydrogen pressure P2 becomes lower, and the difference (P1-P2) becomes greater than a predetermined value "t", it is immediately determined that hydrogen leakage occurs in the hydrogen injector $I_1$ or $I_3$, and the hydrogen injector $I_1$ or $I_3$ does not normally operate. According to this determination, the stuck-open failure flag (FLAG) is set from "0" to "1".

Figure 7:
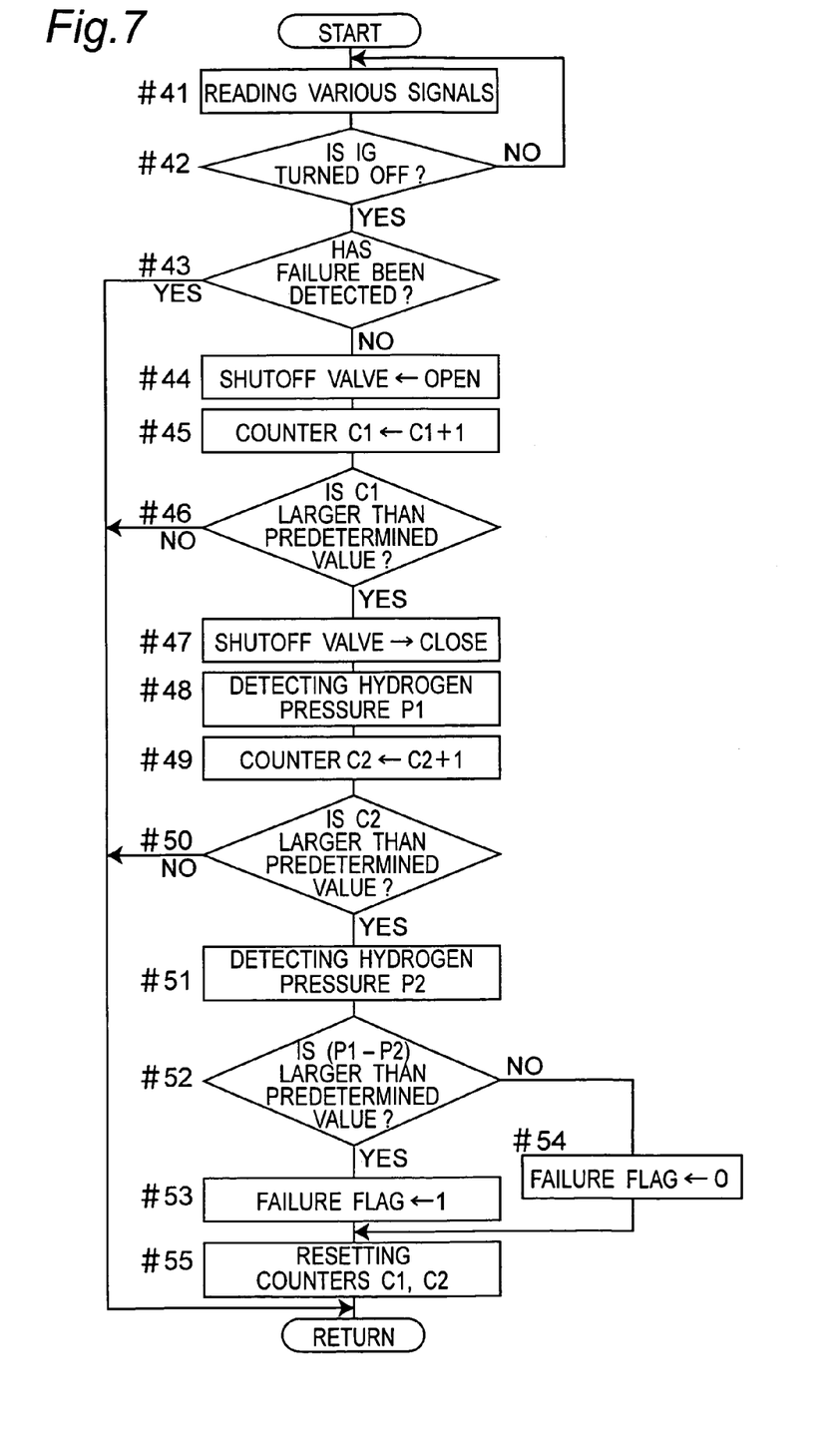
FIG. 7 is a flowchart showing the hydrogen-injector stuck-open failure detection process and a fuel-supply control process to be performed in response to the engine stop operation according to the control unit.

FIG. 7 is a flowchart showing the hydrogen-injector stuck-open failure detection process and the fuel-supply control process to be performed in response to the engine stop operation according to the control unit 10. In this process, various signals detected by a plurality of components associated with the hydrogen-fueled engine 1, as shown, for example, in FIG. 2, are read (#41), and it is determined whether the hydrogen-fueled engine 1 is stopped or whether the ignition switch is switched from the ON state to the OFF state (#42). If the determination in Step #42 is NO, or it is determined that the hydrogen-fueled engine 1 is not stopped, the process returns to Step #41, and the subsequent steps will be repeated. If it is determined that the hydrogen-fueled engine 1 is stopped, the process advances to Step #43.

In Step #43, it is determined whether a stuck-open failure of the hydrogen injectors $I_1$ and $I_3$ has already been detected. If the determination in Step #43 is YES, or it is determined that the stuck-open failure has already been detected, the process is immediately returned. If it is determined that the stuck-open failure has not been detected, the shutoff valve 16 is opened (#44), and a first counter is incremented by one (C1→C1+1) (#45).

After Step #45, it is determined whether the first counter has a value greater than a predetermined value (#46). If the determination in Step #46 is NO, or it is determined that the first counter has a value equal to or less than the predetermined value, the process is immediately returned. If it is determined that the first counter has a value greater than the predetermined value, the shutoff valve 16 is closed (#47), and at this moment, a hydrogen pressure P1 (see FIG. 4) in a region of the hydrogen supply pipe between the shutoff valve 16 and the hydrogen injectors $I_1$ and $I_3$ is detected by the pressure sensor 17 (#48). Then, a second counter is incremented by one (C2→C2+1) (#49).

After Step #49, it is determined whether the second counter has a value greater than a predetermined value (#50). If the determination in Step #50 is NO, or it is determined that the second counter has a value equal to or less than the predetermined value, the process is immediately returned. If it is determined that the second counter has a value greater than the predetermined value, a hydrogen pressure P2 (see FIG. 4) in the region of the hydrogen supply pipe between the shutoff valve 16 and the hydrogen injectors $I_1$ and $I_3$ is detected at this moment by the pressure sensor 17 (#51).

After Step #51, it is determined whether a difference (P1-P2) between the hydrogen pressures P1 and P2 is greater than a predetermined value (#52). If the determination in Step #52 is YES, or it is determined whether (P1-P2) is greater than the predetermined value, it is regarded that a stuck-open failure occurs in the hydrogen injector $I_1$ or $I_3$, and the stuck-open failure flag (FLAG) is set to "1" (#53). If it is determined whether (P1-P2) is equal to or less than the predetermined value, it is regarded that the hydrogen injectors $I_1$ and $I_3$ are normal, and the stuck-open failure flag is set to "0" (#54). After each of Steps #53 and #54, the first and second counters are reset (#55). Then, the process is returned.

Figure 8:
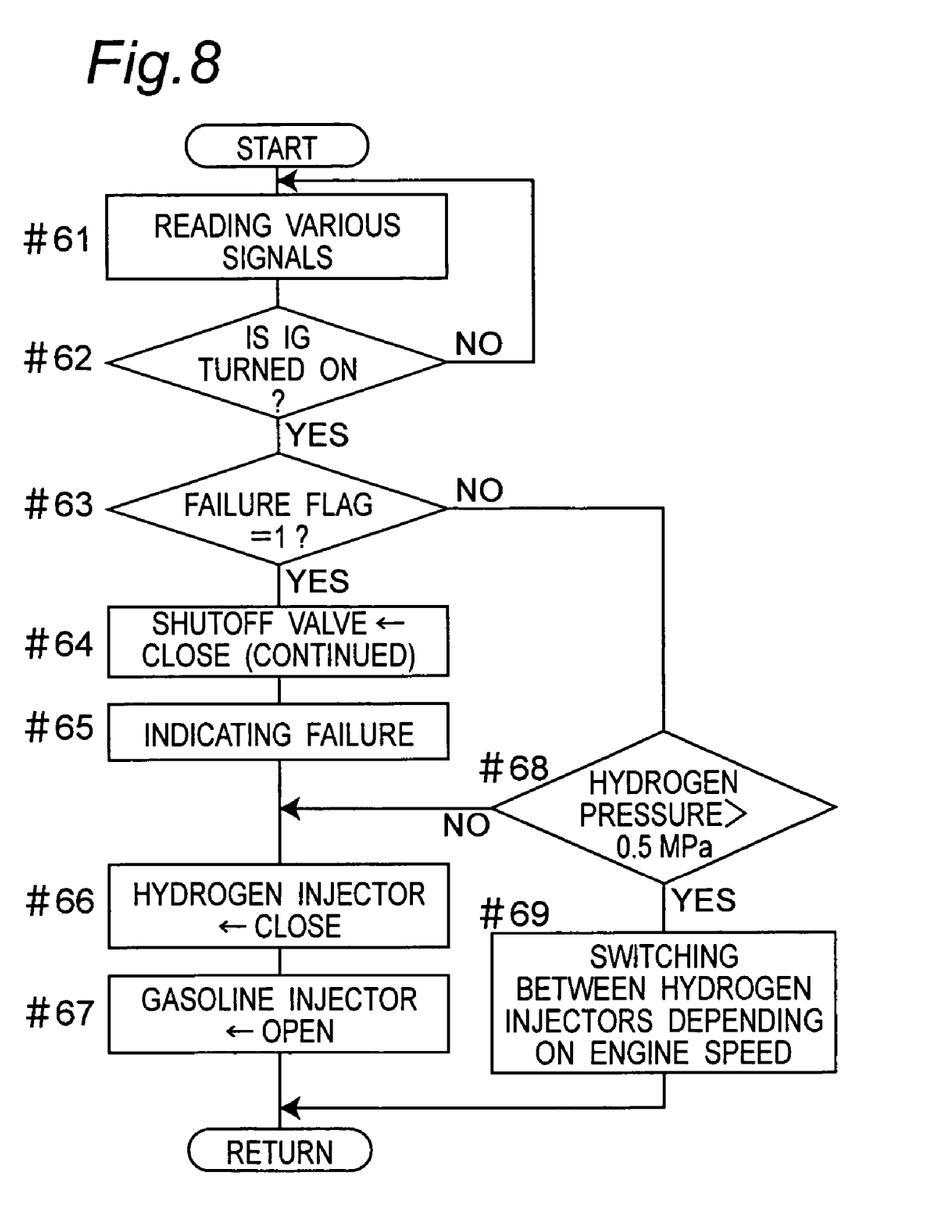
FIG. 8 is a flowchart showing a process to be performed in response to an engine start operation, correspondingly to the process in FIG. 7.

FIG. 8 is a flowchart showing a process to be performed in response to an engine start operation, correspondingly to the process in FIG. 7. In this process, various signals detected by a plurality of components associated with the hydrogen-fueled engine 1, as shown, for example, in FIG. 2, are read (#61), and it is determined whether the hydrogen-fueled engine 1 is started or whether the ignition switch is switched from the OFF state to the ON state (#62). If the determination in Step #62 is NO, or it is determined that the hydrogen-fueled engine 1 is not started, the process returns to Step #61, and the subsequent steps will be repeated. If it is determined that the hydrogen-fueled engine 1 is started, the process advances to Step #63.

In Step #63, it is determined whether the stuck-open failure flag is "1". If the determination in Step #63 is NO, or it is determined whether the stuck-open failure flag is "0", the process advances to Step #68. If it is determined whether the stuck-open failure flag is "1", the shutoff valve 16 is maintained in the closed state (#64), and then a stuck-open failure indication for informing a driver of occurrence of a stuck-open failure is generated (#65). For example, as this stuck-open failure indication, a message "Hydrogen Injector Stuck-Open Failure" may be displayed on an in-vehicle monitor, or an alarm lamp incorporated in an instrument panel together with various meters, such as a tachometer, may be turned on. After Step #65, the hydrogen injector $I_1$ or $I_3$ is closed (#66), and then the gasoline injector $I_2$ is opened (#67). Then, the process is returned.

After Step #68, it is determined whether the hydrogen pressure detected by the pressure sensor 17 (see FIG. 2) is greater than 0.5 MPa (#68). If the determination in Step #68 is NO, or it is determined that the hydrogen residual pressure is equal to less than 0.5 MPa, it is regarded that a quantity of remaining hydrogen in the hydrogen storage tank 14 is not sufficient, and process advances to Step #66 so as to perform the aforementioned steps. If it is determined that the hydrogen residual pressure is greater than 0.5 MPa, it is regarded that a quantity of remaining hydrogen in the hydrogen storage tank 14 is sufficient, and the direct-injection hydrogen injector $I_1$ and the port-injection hydrogen injector $I_3$ are switched depending on an engine speed (#69), as described above with reference to FIG. 3. Then, the process is returned.

As above, the shutoff valve 16 is closed after being held in the open state for a given time-period from initiation of the operation for stopping the engine from a running state thereof, and then a pressure change in the region of the hydrogen supply pipe between the shutoff valve 16 and the hydrogen injectors $I_1$ and $I_3$ is monitored. Thus, a false detection of the hydrogen injector $I_1$ or $I_3$ can be adequately detected without adverse affects of a pressure fluctuation occurring in the open state of the hydrogen injectors $I_1$ and $I_3$. This makes it possible to prevent hydrogen leakage from the hydrogen injector $I_1$ or $I_3$ to the combustion chamber.

As described with reference to FIGS. 5A and 5B, when the hydrogen-injector stuck-open failure detection process and the fuel-supply control process are performed in response to an engine start operation, an engine power is lowered in conjunction with the operation for closing the shutoff valve 16 to monitor a pressure change, or an engine power is changed in conjunction with an operation for switching from the hydrogen injector $I_1$ or $I_3$ to the gasoline injector $I_2$ in response to detection of a stuck-open failure in the hydrogen injector $I_1$ or $I_3$, during the stuck-open failure detection process. Thus, a driver is likely to feel such changes strange or odd. However, as described with reference to FIGS. 6 to 8, when the hydrogen-injector stuck-open failure detection process and the fuel-supply control process are performed in response to an engine stop operation the lowering or change in engine power will be recognized as one phenomenon during engine stop operation by a driver to suppress the above strange or odd feel.

It is understood that the present invention is not limited to the illustrated embodiment, but various modifications and changes in design may be made therein without departing from spirit and scope of the present invention. For example, while the above embodiment has been described by taking a rotary engine as one example of the hydrogen-fueled engine 1, the present invention is not limited to a rotary engine, but may be applicable to a reciprocal engine. Further, while the above embodiment has been described in connection with an example where the gas-fuel injector stuck-open failure detection system of the present invention is applied to a hydrogen-fueled engine using hydrogen as gas fuel, the present invention may be applicable to any other suitable engine using any gas fuel other than gaseous hydrogen, such as compressed natural gas or liquefied propane gas. Furthermore, the gas-fuel injector stuck-open failure detection system of the present invention may be applicable to any type of vehicle including automobiles, which is equipped with an engine designed to use gas fuel and provided with a gas-fuel injector.

What is claimed is:

1. A stuck-open failure detection system for a gas-fuel injection valve adapted to inject fuel into a combustion chamber of an engine or to inject gas-fuel into an intake passage, comprising:

a shutoff valve interposed in a fuel supply passage fluidically connected to said gas-fuel injection valve, at a position upstream of said gas-fuel injection valve, and adapted to supply gas fuel to said gas-fuel injection valve in its open state;

an open/close controller for controllably opening and closing said shutoff valve;

a pressure detector for detecting a pressure in a region of said fuel supply passage between said gas-fuel injection valve and said shutoff valve; and a stuck-open failure detector for detecting a stuck-open failure that said gas-fuel injection valve is stuck in the open state, based on a pressure change detected by said pressure detector, wherein:

said open/close controller is operable, in response to an operation for starting the engine, to open and said shutoff valve immediately after an ignition switch has been turned ON and then close said shut off valve after a lapse of a first given time, and said stuck-open failure detector is operable to detect said stuck-open failure of said gas-fuel injection valve disposed at a position downstream of said shutoff valve, if a pressure change, which is produced between a first moment that said shutoff valve is closed and a second moment that a second given time has lapsed from said first moment, is larger than a predetermined value.

2. The stuck-open failure detection system according to claim 1, wherein said engine is adapted to use both gas fuel and gasoline, said engine being provided with a fuel-supply-mode switch for switching between a gasoline supply mode and a gas-fuel supply mode, and an ignition controller for controlling an operation of a spark plug for igniting fuel in said combustion chamber, wherein:

said ignition controller is operable, when the stuck-open failure is detected by said stuck-open failure detector, to stop the ignition operation of said spark plug for a given time-period after said detection so as to facilitate scavenging; and said fuel-supply-mode switch is operable, after the scavenging under the stop of the ignition operation, to switch from the gas-fuel supply mode to the gasoline supply mode.

3. The stuck-open failure detection system according to claim 2, further comprising an oxygen concentration sensor attached to an exhaust passage, wherein said fuel-supply-mode switch performs the switching operation to the gasoline supply mode in a state of the stuck-open failure of said gas-fuel injection valve, if an oxygen concentration detected by said oxygen concentration sensor is larger than or equal to a predetermined value.

4. A stuck-open failure detection system for a gas-fuel injection valve adapted to inject fuel into a combustion chamber of an engine or to inject gas-fuel into an intake passage, comprising:

a shutoff valve interposed in a fuel supply passage fluidically connected to said gas-fuel injection valve, at a position upstream of said gas-fuel injection valve, and adapted to supply gas fuel to said gas-fuel injection valve in its open state;

an open/close controller for controllably opening and closing said shutoff valve;

a pressure detector for detecting a pressure in a region of said fuel supply passage between said gas-fuel injection valve and said shutoff valve; and a stuck-open failure detector for detecting a stuck-open failure that said gas-fuel injection valve is stuck in the open state, based on a pressure change detected by said pressure detector, wherein, said open/close controller is operable, in response to an operation for stopping the engine from the running state thereof, to close said shutoff valve after holding said shutoff valve in the open state for a first given time after an ignition switch has been turned OFF, and said stuck-open failure detector is operable to detect said stuck-open failure of said gas-fuel injection valve disposed at a position downstream of said shutoff valve, if a pressure change, which is produced between a first moment that said shutoff valve is closed and a second moment that a second given time has lapsed from said first moment, is larger than a predetermined value.

5. The stuck-open failure detection system according to claim 4, further comprising an alarm unit for generating an alarm when the stuck-open failure is detected by said stuck-open failure detector.

* * * * *